United States Patent [19]

Tanaka et al.

[11] Patent Number: 5,552,479
[45] Date of Patent: Sep. 3, 1996

[54] GAS BARRIER FILM AND PRODUCTION PROCESS THEREOF

[75] Inventors: Hideaki Tanaka; Hiroyuki Oba, both of Ibaraki-ken; Kazuhiko Hirose, Chiba-ken, all of Japan

[73] Assignee: Kureha Kagaku Kogyo K. K., Tokyo, Japan

[21] Appl. No.: 185,353

[22] Filed: Jan. 24, 1994

[30] Foreign Application Priority Data

Jan. 27, 1993 [JP] Japan .................................. 5-031404

[51] Int. Cl.$^6$ .............................. C08L 29/04; C08L 33/02
[52] U.S. Cl. ................................. 525/57; 525/56; 525/221
[58] Field of Search .............................. 525/57, 221, 56

[56] References Cited

U.S. PATENT DOCUMENTS

| | | | |
|---|---|---|---|
| 2,169,250 | 8/1939 | Izard | 18/54 |
| 2,557,266 | 6/1951 | Dittmar | 525/57 |
| 3,634,295 | 1/1972 | Dunlap et al. | 525/57 |
| 3,645,939 | 2/1972 | Gaylord | 525/57 |
| 3,736,311 | 5/1973 | Subramanian | 525/57 |
| 3,743,536 | 6/1973 | Russell | 525/57 |
| 3,801,675 | 4/1974 | Russell | 525/57 |
| 4,169,088 | 9/1979 | Hansen | 525/57 |
| 4,280,942 | 7/1981 | Green | 525/57 |

FOREIGN PATENT DOCUMENTS

| | | | |
|---|---|---|---|
| 0152180 | 8/1985 | European Pat. Off. . | |
| 0152770 | 5/1979 | Japan | 525/57 |
| 1204254 | 3/1985 | Japan | 525/57 |
| 2115064 | 11/1985 | Japan | 525/57 |
| 63-47743 | 9/1988 | Japan . | |
| 2-14376 | 4/1990 | Japan . | |
| 2-27941 | 6/1990 | Japan . | |
| 0596750 | 5/1944 | United Kingdom | 525/57 |
| 2090603 | 7/1982 | United Kingdom . | |

OTHER PUBLICATIONS

*Encyclopedia of Polymer Science & Engineering;* (1989); p. 173.

*Primary Examiner*—W. Robinson H. Clark
*Attorney, Agent, or Firm*—Lowe, Price, Leblanc & Becker

[57] ABSTRACT

Disclosed herein is a gas barrier film formed from a mixture containing polyvinyl alcohol and poly(meth)acrylic acid at a weight ratio of 95:5 to 20:80, and having an oxygen permeability constant of $1.25 \times 10^{-3}$ ml(STP).cm/m$^2$.h.atm{Pa} or smaller as measured under conditions of 30° C. and 80% relative humidity. A production process of the gas barrier film, in which a film formed from a mixture containing polyvinyl alcohol and poly(meth)acrylic acid is subjected to a heat treatment under specific conditions, is also disclosed. The gas barrier film of the invention are far excellent in gas barrier property under high-humidity conditions and also superb in water resistance.

17 Claims, 3 Drawing Sheets

GAS BARRIER FILM AND PRODUCTION PROCESS THEREOF

FIELD OF THE INVENTION

The present invention relates to gas barrier films. More particularly, it relates to films formed from a mixture containing polyvinyl alcohol (PVA) and poly(meth)acrylic acid, and having excellent oxygen gas barrier property. The films according to the present invention are excellent in water resistance and oxygen gas barrier property and free of any chlorine atom, and are hence suitable for use as food packaging materials and the like.

BACKGROUND OF THE INVENTION

A PVA film is formed by a casting process making use of water as a solvent, or an extrusion process. The PVA film features that it is flexible and antistatic, and moreover has the best oxygen gas barrier property among synthetic resin films in a dry state. Therefore, the use of the PVA film has heretofore been intended to develop to the field of packaging materials, for which good oxygen gas barrier property is required, making good use of this gas barrier property. However, the oxygen gas barrier property of the PVA film greatly depends on humidity and are hence impaired to a great extent due to moisture absorption under high-humidity conditions. Further, the PVA film is easy to dissolve in boiling water.

A PVA film has hitherto been used in the form of a laminate film of a multi-layer structure having at least two layers of the PVA film and another film when using it for a purpose in which practical oxygen gas barrier property is required, whereby the influence of humidity has been lessened as much as possible. In the method forming the laminate film, however, water vapor barrier property and water resistance are still insufficient. There are thus demands for improving the water resistance of the PVA itself and allowing the PVA film to satisfactorily keep the good oxygen gas barrier property even under high-humidity conditions.

In order to solve the above problems involved in the PVA film, various investigations such as, for example, those described below have heretofore been made.

(1) To Impart Water Resistance by Chemical Modification of Hydroxyl Groups in PVA It has been known to convert hydroxyl groups in PVA into a form of acetal with aldehydes. However, this method has a disadvantage that although water insolubility can be imparted to PVA, the oxygen gas barrier property of the resulting films is markedly lowered if absorbing water.

In U.S. Pat. No. 2,169,250, it has been proposed to form films, fibers and the like from an aqueous mixture solution containing PVA and a polycarboxylic acid, and heat the formed products to react the hydroxyl groups in PVA with the polycarboxylic acid so as to form a cross-linked structure, whereby the formed products are made insoluble in water.

(2) To Impart Water Resistance by Heat Treatment

A PVA film tends to crystallize by heat treatment, so that its water resistance is improved. In addition, biaxial stretching of the PVA film can facilitate its orientation and crystallization, and moreover improve its mechanical properties. Therefore, it has been known to subject a PVA film to biaxial stretching and heat treatment, thereby improving its water or moisture resistance. However, this method has a disadvantage that although water insolubility can be imparted to the PVA film, the oxygen gas barrier property of the film is markedly lowered if absorbing water. In particular, the film undergoes deformation and changes in physical properties due to moisture absorption under high-humidity conditions.

(3) To Impart Water Resistance by Polyvinylidene Chloride Latex Coat

It has been known to coat a PVA film with a polyvinylidene chloride latex so as to impart moisture resistance to the PVA film. However, chlorine gas attributable to chlorine in the polyvinylidene chloride generates upon its incineration in waste treatment, and this method hence involves a problem from the viewpoint of environment.

(4) To Impart Water Resistance by Copolymerization

When a copolymer of ethylene and vinyl acetate is hydrolyzed, an ethylene-vinyl alcohol copolymer (EVOH) is obtained. An EVOH film is a film combining good oxygen gas barrier property which is a feature of PVA films with properties inherent in thermoplastic films. However, the oxygen gas barrier property of the EVOH film greatly depends on humidity. The improvement in prevention against the reduction of the oxygen gas barrier performance due to moisture absorption is not yet sufficiently made.

As described above, the conventional measures for imparting water resistance to PVA films are still insufficient from the viewpoint of keeping the excellent oxygen gas barrier performance of the PVA films under dry conditions even under conditions of high humidity or high temperature and humidity.

On the other hand, there have been proposed films and sheets making use of a mixture of PVA and polyacrylic acid (for example, Japanese Patent Application Laid-Open No. 47743/1988, and Japanese Patent Publication Nos. 14376/1990 and 27941/1990). These films and sheets all are water-soluble or water-absorbable and not films having good water resistance and oxygen gas barrier property.

Incidentally, the above-described U.S. Pat. No. 2,169,250 also discloses the use of polymethacrylic acid or polyacrylic acid as the polycarboxylic acid for reacting with PVA. As a specific example thereof, it is described to polymerize a methacrylic acid monomer in a solution of PVA in water, cast the resulting reaction mixture on a support, evaporate the water, and then heat the dry film for 5 minutes at 140° C., thereby reacting PVA with polymethacrylic acid to obtain a water-insoluble film (Example I). According to the results of an investigation by the present inventors, however, any film exhibiting excellent oxygen gas barrier property under high-humidity conditions can not be obtained by this heat treatment conditions. Besides, even if other specific heat treatment conditions (Examples II–V) described in this document are applied, any film exhibiting excellent oxygen gas barrier property under high-humidity conditions can not be obtained from a mixture of PVA and poly(meth)acrylic acid.

OBJECTS AND SUMMARY OF THE INVENTION

It is an object of the present invention to provide a film formed from a mixture of PVA and poly(meth)acrylic acid, exhibiting far excellent oxygen gas barrier property under high-humidity conditions and besides having excellent water resistance.

The present inventors have carried out an extensive investigation. As a result, it has been found that when a film is formed from a mixture containing PVA and poly- (meth)acrylic acid in specific proportions, for example, by casting an aqueous solution of the mixture on a support and then drying the resulting film, and the dry film is subjected to a heat treatment under specific conditions, a film having remarkably improved oxygen gas barrier property (oxygen permeability constant) even under high-humidity conditions to say nothing of dry conditions compared with the films made of PVA alone, and excellent water resistance can be obtained. Besides, this film contains no chlorine atom and hence does not generate chlorine gas upon its incineration.

The present invention has been led to completion on the basis of this finding.

According to the present invention, there is thus provided a gas barrier film formed from a mixture containing polyvinyl alcohol and poly(meth)acrylic acid at a weight ratio of 95:5 to 20:80, and having an oxygen permeability constant of $1.25 \times 10^{-3}$ ml(STP).cm/m².h.atm{Pa} or smaller as measured under conditions of 30° C. and 80% relative humidity (RH).

According to the present invention, there is also provided a process for the production of a gas barrier film, which comprises forming a film from a mixture containing polyvinyl alcohol and poly(meth)acrylic acid at a weight ratio of 95:5 to 20:80, and then subjecting the film to a heat treatment under conditions satisfying the following relationships (a) and (b):

$$\log t \geq -0.0282 \times T + 14.14 \quad (a)$$

$$373 \leq T \leq 523 \quad (b)$$

wherein t means heat-treating time (min) and T denotes a heat-treating temperature (K.).

DETAILED DESCRIPTION OF THE INVENTION

The present invention will hereinafter be described in detail.

Preferable examples of the PVA useful in the practice of the present invention may include those having a saponification degree of, preferably, at least 95%, more preferably, at least 98%, and an average polymerization degree of, preferably, 300–2,500, more preferably, 300–1,500.

The poly(meth)acrylic acid useful in the practice of this invention is polyacrylic acid, polymethacrylic acid or a mixture thereof and has at least two carboxyl groups in its molecule. Preferable examples thereof may include homopolymers of acrylic acid or methacrylic acid, and copolymers thereof.

The poly(meth)acrylic acid preferably has an average molecular weight ranging from 2,000 to 250,000.

A mixed system of the PVA having a high saponification degree and the poly(meth)acrylic acid is excellent in compatibility, and can provide an intimate mixture solution, for example, when dissolved in water. Processes for forming a film from a mixture of these components include a process (solvent casting) in which an aqueous solution of the mixture is cast on a support such as a glass plate or plastic film, and the mixture is dried to form a film, a process (extrusion) in which a liquid with the mixture dissolved in water in a high concentration is cast by an extruder in the form of a film through a thin slit while applying a discharge pressure, and the resulting water-containing film is dried on a rotating drum or belt, and the like. Of these film-forming processes, the solvent casting process is preferred because a dry film excellent in transparency can be obtained from an aqueous solution of a mixture of the PVA and the poly(meth)acrylic acid.

In order to obtain a mixture of the PVA and the poly(meth)acrylic acid, there is used a method in which the respective polymers are dissolved in water, a method in which aqueous solutions of the respective polymers are mixed, a method in which a (meth)acrylic acid monomer is polymerized in an aqueous solution of the PVA, or the like. The mixture may be obtained by using solvents other than water. In the case where the solvent casting process is used, the concentration of the polymer mixture is generally adjusted to about 5–30 wt. %. Incidentally, when the aqueous solution or the liquid with the mixture dissolved in water in a high concentration is prepared, solvents other than water, such as alcohol, flexibilizers, and the like may suitably be added if desired. No particular limitation is imposed on the thickness of the film, and it may hence be suitably determined as necessary for the end application intended. However, it may be generally of the order of 0.1–500 μm, preferably 0.5–200 μm, most preferably 1–100 μm.

Figure 1:
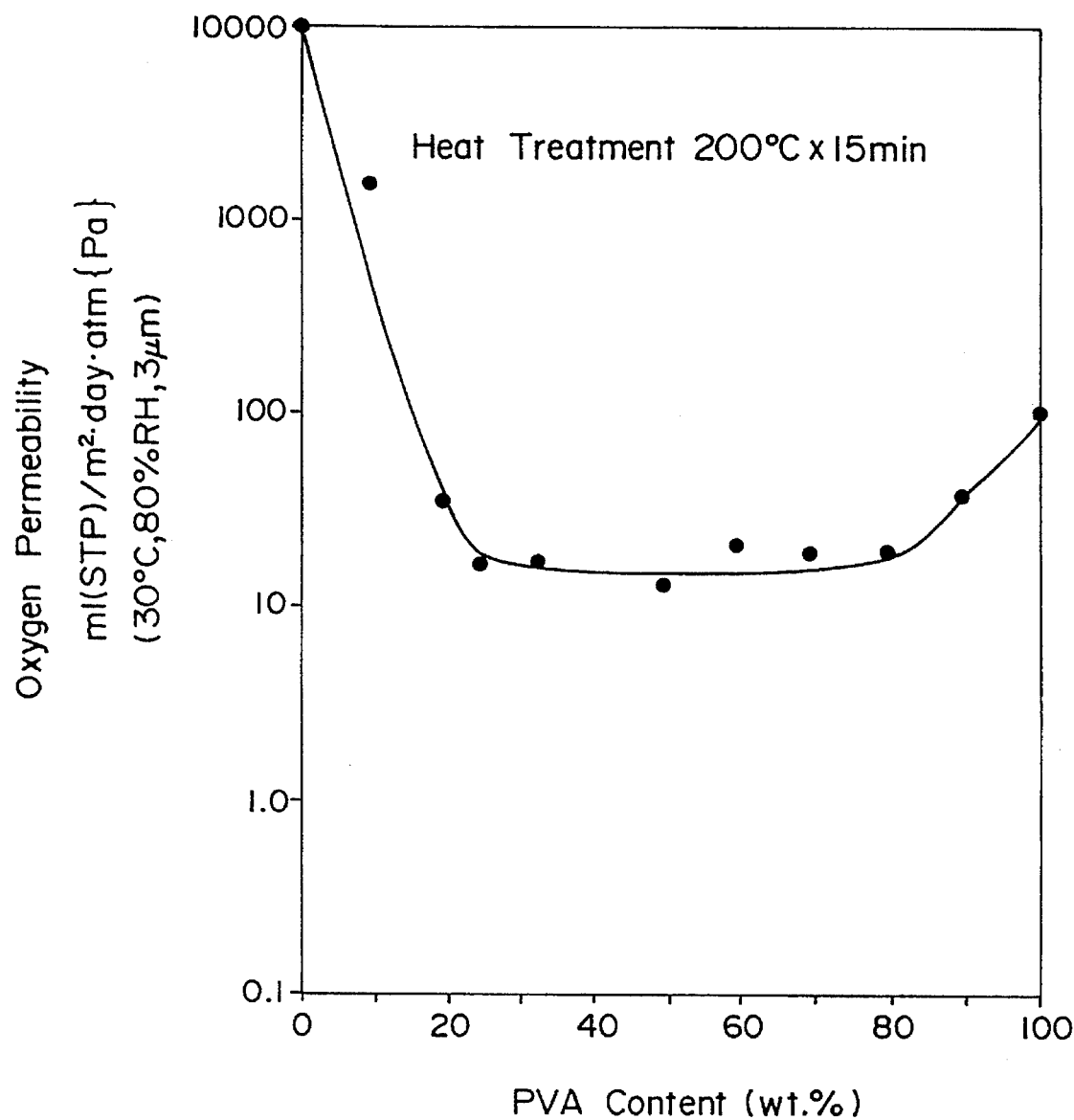
FIG. 1 is a graph showing a relationship between PVA content and oxygen permeability as to heat-treated films obtained by changing the mixing ratio of PVA to polyacrylic acid (PAA)

FIG. 1 is a graph showing the data (see Table 1) obtained by measuring oxygen permeabilities of films, which have been obtained by changing the mixing ratio of PVA to polyacrylic acid to provide dry films of various compositions according to the solvent casting process, and subjecting them to a heat treatment at 200° C. for 15 minutes, under conditions of 80% RH, 30° C. and 3 μm in film thickness. As apparent from FIG. 1, the films containing PVA within a range of 20–95 wt. % exhibit excellent oxygen gas barrier property under high-humidity conditions compared with a film formed of PVA alone. From these experimental data, the mixing ratio by weight of the PVA to the poly(meth)acrylic acid must be controlled to 95:5 to 20:80, preferably 90:10 to 20:80, more preferably 80:20 to 20:80 from the viewpoint of the improvement in oxygen gas barrier property.

As apparent from Table 1, the heat-treating process according to the present invention surprisingly permits the provision of films more markedly improved in oxygen permeability even under conditions of 100% RH, 30° C. and 3 μm in film thickness as the mixing proportion of the poly(meth)acrylic acid increases. More specifically, films exhibiting excellent oxygen gas barrier property even under high-humidity conditions as extremely severe as 100% RH (at 30° C.) can be obtained if the mixing ratio by weight of the PVA to the poly(meth) acrylic acid falls within a range of from 60:40 to 20:80, preferably from 50:50 to 20:80.

Figure 2:
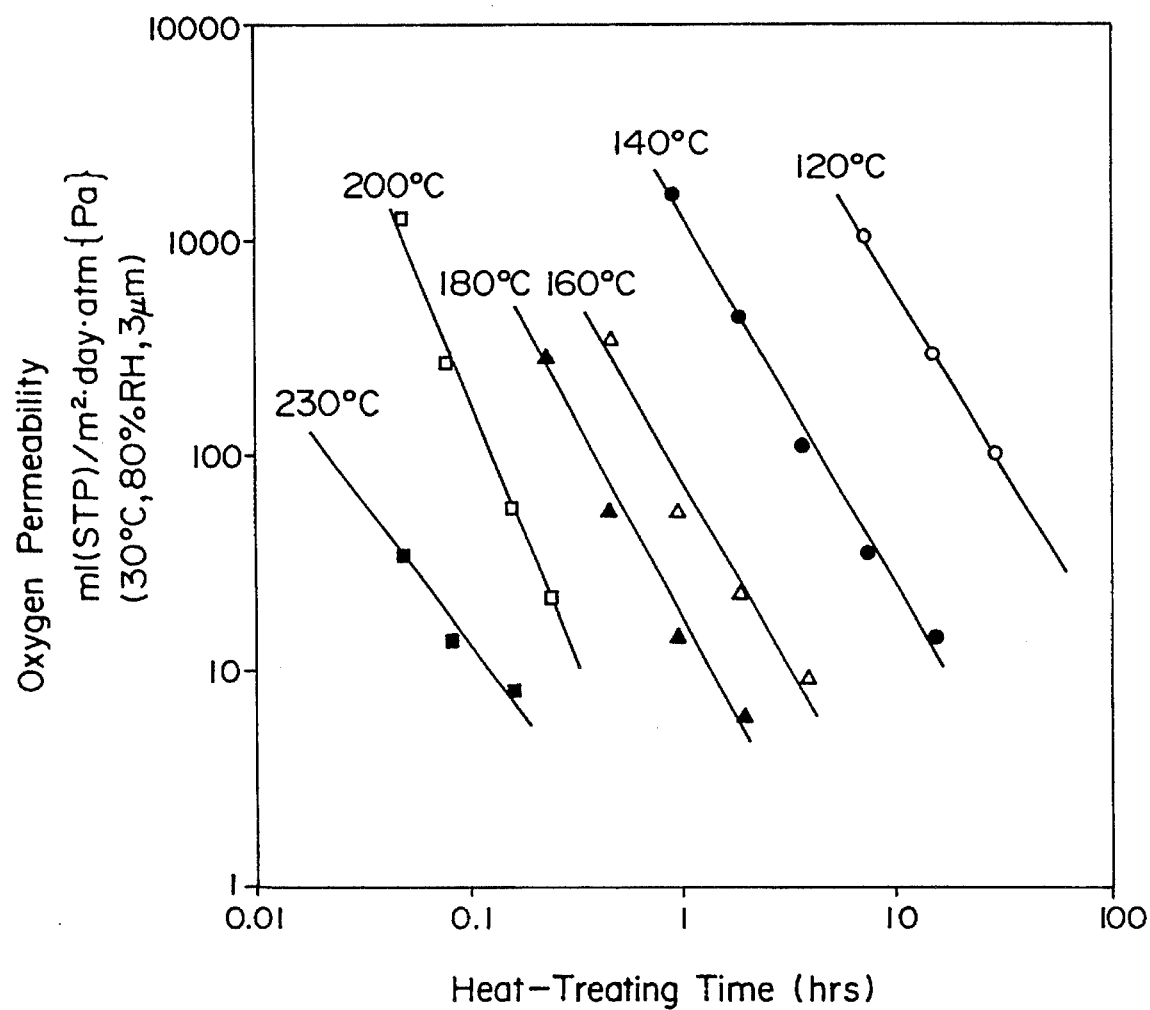
FIG. 2 is a graph showing a relationship among heat-treating temperature, heat-treating time and oxygen permeability as to heat-treated films formed from a mixture of PVA and PAA and obtained by changing the heat-treating temperature.

FIG. 2 is a graph showing the data (see Table 2) obtained by measuring oxygen permeabilities (at 30° C., 80% RH) of heat-treated films, which have been obtained by forming dry films (thickness: 3 μm) from an aqueous solution of a mixture containing the PVA and the polyacrylic acid at a weight ratio of 60:40 and separately subjecting the dry films to a heat treatment with heat-treating temperature and heat-treating time varied. As apparent from FIG. 2, when a film low in oxygen permeability is intended to form, the treating time may be relatively short if the heat-treating temperature is high. However, it takes longer time as the heat-treating temperature becomes low. A heat-treated film (thickness: 3 μm) formed of PVA alone has an oxygen permeability (at 30° C., 80% RH) of about 100 ml(STP)/m².day.atm{Pa}. Therefore, the arrangement of the experimental data on the heat-treating temperature, heat-treating time and oxygen permeability has revealed that in order to have the oxygen permeability of a film formed from a mixture of the PVA and the poly(meth)acrylic acid more improved than a film of PVA alone, the film of the mixture must be subjected to a heat treatment under conditions in which the heat-treating temperature and the heat-treating time satisfy the following relationships (a) and (b):

$$\log t \geq -0.0282 \times T + 14.14 \quad \text{(a)}$$

$$373 \leq T \leq 523 \quad \text{(b)}$$

wherein t means heat-treating time (min) and T denotes a heat-treating temperature (K.).

The use of this heat-treating condition permits the provision of a film formed from a mixture of the PVA and the poly(meth)acrylic acid, and having excellent gas barrier property as demonstrated by an oxygen permeability constant of $1.25 \times 10^{-3}$ ml(STP).cm/m².h.atm{Pa} or smaller as measured under conditions of 30° C. and 80% RH.

In order to achieve an oxygen permeability (at 30° C., 80% RH) of 50 ml(STP)/m².day.atm{Pa} or lower in a film 3 μm thick, it is preferable to use heat-treating conditions satisfying the following relationship (c):

$$\log t \geq -0.0278 \times T + 14.14. \quad \text{(c)}$$

The use of this heat-treating condition (c) permits the provision of a film having an oxygen permeability constant (at 30° C., 80% RH) of $6.25 \times 10^{-4}$ ml(STP).cm/m².h.atm{Pa} or smaller.

Similarly, in order to achieve an oxygen permeability (at 30° C., 80% RH) of 25 ml(STP)/m².day.atm{Pa} or lower in a film 3 μm thick, it is preferable to use heat-treating conditions satisfying the following relationship (d):

$$\log t \geq -0.0274 \times T + 14.14. \quad \text{(d)}$$

The use of this heat-treating condition (d) permits the provision of a film having an oxygen permeability constant (at 30° C., 80% RH) of $3.13 \times 10^{-4}$ ml(STP).cm/m².h.atm{Pa} or smaller.

The heat-treating temperature is selected from a range of from 100° C. (373 K.) to 250° C. (523 K.). However, it takes a very long heat-treating time for obtaining a film high in oxygen gas barrier property if the heat-treating temperature falls within a lower temperature range, resulting in reduction of productivity. High oxygen gas barrier property can be achieved in a shorter heat-treating time as the heat-treating temperature becomes high. However, if the temperature is too high, there is a possibility that the temperature may become near the melting point of PVA, so that discoloration and/or decomposition may occur. Accordingly, the heat-treating temperature may preferably be controlled to a range of from 120° C. (393 K.) to 240° C. (513 K.), more preferably 160° C. (433 K.) to 230° C. (503 K.).

By the way, it has been found that oxygen permeability under dry conditions (30° C., 0% RH, 3 μm in film thickness) is improved simply by casting an aqueous solution of a mixture containing the PVA and the poly(meth)acrylic acid at a weight ratio within a range of from 90:10 to 50:50 into a dry film compared with a simple PVA film formed in the like way, and the oxygen permeability of the mixture film reaches the minimum value when the ratio of PVA to polyacrylic acid is 80:20 by weight. However, this dry film exhibits the excellent gas barrier performance only under dry or low-humidity conditions like the simple PVA film. Under high-humidity conditions, such performance is greatly impaired, and moreover, the film is easy to dissolve in boiling water.

On the contrary, the use of the heat-treating conditions according to the present invention permits the provision of a water-resistant film exhibiting high oxygen gas barrier property, which has not been achieved to date, even under high-humidity conditions. As described above, U.S. Pat. No. 2,169,250 discloses a heat-treated film composed of a mixture of PVA and polymethacrylic acid. However, the heat-treating conditions in that document are only intended to form a crosslinked structure so as to insolubilize the film in water. If the heat-treating temperature and time specifically described in the document are applied to the mixture film according to the present invention, any film exhibiting high gas barrier property under high-humidity conditions can not be obtained. In this respect, the heat-treating conditions used in the present invention are new matter which has not been disclosed to date. Besides, films obtained under such conditions are also novel oxygen gas barrier films.

The gas barrier films according to the present invention exhibit high oxygen gas barrier property under high-humidity conditions, and are hence suitable for use particularly in the field of food packaging materials in the form of a single film or a laminate film with one or more other films.

ADVANTAGES OF THE INVENTION

PVA films have oxygen permeability greatly depending on humidity, and have hence been unsuitable for use under high-humidity conditions. Many proposals have been made for imparting water resistance to PVA films. However, such proposals are still insufficient from the viewpoint of fully keeping the excellent oxygen gas barrier property of the PVA film under dry conditions even under high-humidity conditions. The PVA films thus treated are difficult to use under conditions of higher temperature and humidity. On the contrary, the present invention permits the provision of films, which are formed from a mixture containing the PVA and the poly(meth)acrylic acid, and far excellent in gas barrier property under high-humidity conditions and moreover superb in water resistance, by using specific heat-treating conditions.

The films according to the present invention exhibit excellent oxygen gas barrier property even under high-humidity conditions and show excellent water resistance even under high-temperature and high-humidity conditions, and are hence suitable for use, as food packaging materials, in packaging food and drink liable to be deteriorated by oxygen, for example, meat, processed meat products such as hams and sausages, juices, soda pop, etc.

EMBODIMENTS OF THE INVENTION

The present invention will hereinafter be described more specifically by the following examples and comparative examples. It should however be borne in mind that the present invention is not limited to the following examples only.

Example 1

Poval 105 (product of Kuraray Co., Ltd, trade name; saponification degree: 98.5%, average polymerization degree: 500) and a 25 wt. % aqueous solution of polyacrylic acid (product of Wako Pure Chemical Industries, Ltd., average molecular weight: 150,000) were used as PVA and polyacrylic acid (PAA), respectively, to prepare respective 10 wt. % aqueous solutions. These solutions were mixed to prepare an aqueous mixture solution containing PVA and PAA at a weight ratio of 60:40.

This mixture solution was coated by using K CONTROL COATER 303 (manufactured by PK Print-Coat Instruments, Ltd.) on a stretched polyethylene terephthalate film (stretched PET film 16 µm thick), and water was then evaporated by a dryer, thereby obtaining a dry film of 3 µm thick. The stretched PET film on which this dry film had been formed was subjected to a heat treatment at 200° C. for 15 minutes in an oven. As a result, a film far excellent in oxygen gas barrier property was obtained, in which the oxygen permeability of the dry film at 80% RH and 30° C. was improved to 21 ml(STP)/m².day.atm{Pa} per 3 µm of the thickness. The heat-treated film was insoluble in boiling water.

Measurement of Oxygen Permeability

The oxygen permeability of the film according to the present invention was determined by conducting measurement by means of oxygen permeability testers, OX-TRAN (trade name) 2/20 and 100TWIN, both, manufactured by Modern Control Company and calculating $P_{film}$ in accordance with the following equation:

$$1/P_{total} = 1/P_{film} + 1/P_{PET}$$

wherein $P_{total}$ means an oxygen permeability of the stretched PET film coated with the film of this invention, $P_{film}$ denotes an oxygen permeability of the film according to this invention, and $P_{PET}$ stands for an oxygen permeability of the stretched PET film as a support.

Comparative Example 1

A dry film 3 µm thick was formed on the stretched PET film and then subjected to a heat treatment in the same manner as in Example 1 except that a 10 wt. % aqueous solution of PVA was used instead of the mixture of PVA and PAA in Example 1, thereby obtaining a PVA film having an oxygen permeability at 80% RH and 30° C. of 100 ml(STP)/m².day.atm{Pa} per 3 µm of the thickness. This PVA film was soluble in boiling water.

Besides, a dry film was formed and then subjected to a heat treatment in the same manner as in Example 1 except that a 10 wt. % aqueous solution of PAA was used instead of the mixture of PVA and PAA in Example 1, thereby obtaining a PAA film having an oxygen permeability at 80% RH and 30° C. of 10,000 ml(STP)/m².day.atm{Pa} per 3 µm of the thickness. This PAA film was soluble in boiling water.

Example 2 and Comparative Example 2

Using the same 10 wt. % aqueous solutions of PVA and PAA as those used in Example 1, aqueous mixture solutions were prepared so as to give compositions by weight of PVA/PAA=90/10 to 20/80 as shown in Table 1. The mixture solutions were separately formed into dry films 3 µm thick on the stretched PET film in the same manner as in Example 1.

For the sake of comparison, a dry film having a composition of PVA/PAA=10/90 was also formed (Comparative Example 2).

(1) The oxygen permeability of each of the thus-obtained dry films was measured under dry conditions of 0% RH and 30° C. without subjecting the film to any heat treatment. The results are shown in Table 1 (see the "Dry" column in Table 1).

(2) Each of the thus-obtained dry films were subjected to a heat treatment at 200° C. for 15 minutes to form a heat-treated film. The oxygen permeability of this heat-treated film was measured under high-humidity conditions of 80% RH and 30° C. The results are shown in Table 1 (see the "80% RH" column in Table 1).

(3) The oxygen permeability of the above-described heat-treated film was measured under high-humidity conditions of 100% RH and 30° C. The results are shown in Table 1 (see the "100% RH" column in Table 1).

Incidentally, the results of oxygen permeabilities measured under the above-described conditions on the films before and after the heat treatment, which have been obtained in Example 1 and Comparative Example 1, are also shown collectively in Table 1.

TABLE 1

| Composition (weight ratio) | | Oxygen permeability ml (STP)/m² · day · atm{Pa}, (30° C., 3 µm) | | |
|---|---|---|---|---|
| PVA | PAA | Dry | 80% RH | 100% RH |
| 100 | 0 | 1.2 | 100 | 1820 |
| 90 | 10 | 1.2 | 39 | 1040 |
| 80 | 20 | 0.3 | 19 | 190 |
| 70 | 30 | 0.4 | 19 | 220 |
| 60 | 40 | 0.9 | 21 | 110 |
| 50 | 50 | 1.2 | 16 | 77 |
| 30 | 70 | 2.1 | 17 | 49 |
| 25 | 75 | — | 17 | 20 |
| 20 | 80 | — | 35 | 37 |
| 10 | 90 | 3.0 | 1350 | N.D.* |
| 0 | 100 | 2.6 | 10000 | N.D.* |

*N.D. means that the measurement of the oxygen permeability was impossible because the film started to dissolve during the measurement and hence became impossible to keep the shape of the film.

The data indicative of the relationship between the oxygen permeability measured at 80% RH and 30° C. and the PVA content among the data in Table 1 are graphically illustrated in FIG. 1.

As apparent from Table 1 and FIG. 1, it is understood that the films according to the present invention exhibit excellent oxygen gas barrier property under high-humidity conditions of 80% RH and 30° C. Further, they have a feature that they keep excellent oxygen gas barrier property even under extremely high-humidity conditions of 100% RH and 30° C. All the films of this invention, which had been obtained by conducting the heat treatment, were insoluble in boiling water. On the contrary, all the films before the heat treatment were soluble in boiling water.

Example 3

A dry film 3 µm thick, which had a composition of PVA:PAA =60:40 by weight, was formed on the stretched PET film in the same manner as in Example 1. Portions of the stretched PET film on which this dry film had been formed were separately subjected to a heat treatment in the oven with heat-treating temperature and heat-treating time varied as shown in Table 2. The oxygen permeability of each of the heat-treated film portions was measured at 80% RH and 30° C. The results are shown in Table 2.

TABLE 2

| Heat-treating conditions | | Oxygen permeability ml (STP)/m² · day · atm{Pa} |
|---|---|---|
| Temperature | Time | (30° C., 80% RH, 3 μm) |
| 120° C. | 2 hours | N.D.* |
| | 4 hours | N.D.* |
| | 8 hours | 1010 |
| | 16 hours | 280 |
| | 31 hours | 100 |
| 140° C. | 1 hour | 1570 |
| | 2 hours | 430 |
| | 4 hours | 110 |
| | 8 hours | 35 |
| | 16 hours | 14 |
| 160° C. | 30 minutes | 330 |
| | 1 hour | 52 |
| | 2 hours | 22 |
| | 4 hours | 9 |
| 180° C. | 15 minutes | 270 |
| | 30 minutes | 54 |
| | 1 hour | 14 |
| | 2 hours | 6 |
| 200° C. | 3 minutes | 1200 |
| | 5 minutes | 260 |
| | 10 minutes | 55 |
| | 15 minutes | 21 |
| 230° C. | 3 minutes | 33 |
| | 5 minutes | 14 |
| | 10 minutes | 8 |

*N.D. means that the measurement was impossible because the oxygen permeability of the stretched PET film as a support was close to the oxygen permeability of the stretched PET film on which the film according to the present invention had been coated.

With respect to the data in Table 2, the relationship between the heat-treating time and the oxygen permeability in each of the heat-treating temperatures is graphically illustrated in FIG. 2.

As described in Comparative Example 1, when the PVA film (thickness: 3 μm) is subjected to a heat treatment at 200° C. for 15 minutes, a heat-treated film having an oxygen permeability at 80% RH and 30° C. of 100 ml(STP)/m².day.atm{Pa} is obtained. In FIG. 2, intersections of a straight line indicating an oxygen permeability of 100 ml(STP)/m².day.atm{Pa} with lines in the respective heat-treating temperatures were found. The thus-found intersections were graphically illustrated with the heat-treating temperature and the common logarithm of the heat-treating time (hr) taken on the axis of abscissas and the axis of ordinates, respectively, and shown as a straight line in FIG. 3. This straight line indicates heat-treating temperature and time required to achieve an oxygen permeability of 100 ml(STP)/m².day.atm{Pa}. In order to achieve an oxygen permeability lower than this value, i.e., an oxygen permeability constant not greater than $1.25 \times 10^{-3}$ ml(STP)cm/m².h.atm{Pa}, the heat treatment must be conducted within the range satisfying the relationships (a) and (b).

Figure 3:
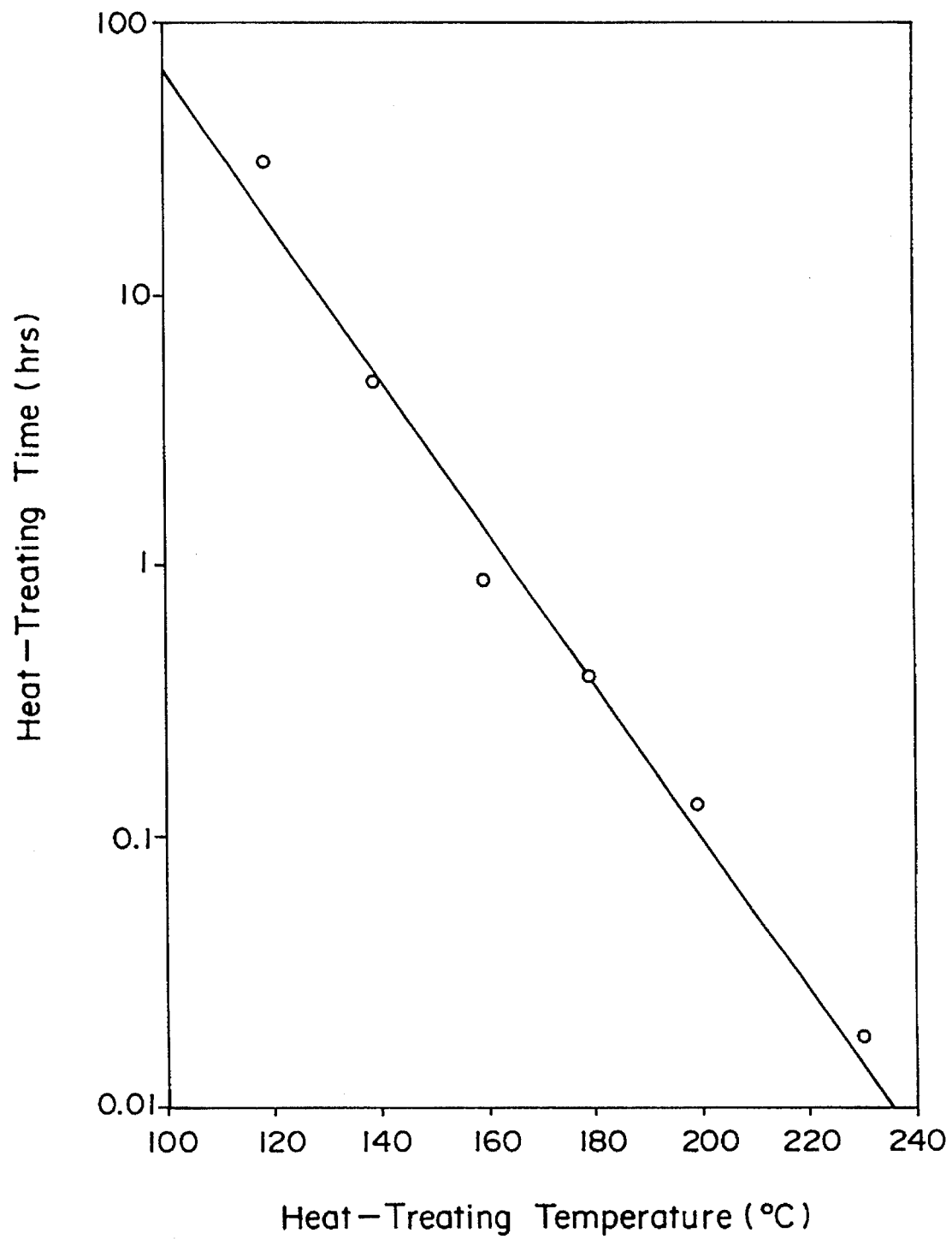
FIG. 3 is a graph showing heat-treating conditions under which a heat-treated film having an oxygen permeability constant of $1.25 \times 10^{-3}$ ml(STP).cm/m².h.atm{Pa} or smaller can be obtained.

The area above the straight line shown in FIG. 3 indicates a part of this range.

When a straight line indicating an oxygen permeability of 50 ml(STP)/m².day.atm{Pa} is used, the relationship (c) can be obtained. Besides, when a straight line indicating an oxygen permeability of 25 ml(STP)/m².day.atm{Pa} is used, the relationship (d) can be obtained.

Example 4 and Comparative Example 3

The same PVA as that used in Example 1 and a 20 wt. % aqueous solution of polymethacrylic acid (AC-30H) (product of NIHON JUNYAKU co., Ltd., average molecular weight: 50,000) were used as PVA and polymethacrylic acid (PMAA), respectively, to prepare respective 10 wt. % aqueous solutions. These solutions were mixed to prepare aqueous mixture solutions containing PVA and PMAA at weight ratios of 90:10 and 80:20.

Using these mixture solutions, dry films each 3 μm thick were formed in the same manner as in Example 1. The dry films thus formed were subjected to a heat treatment at 200° C. for 15 minutes to measure their oxygen permeabilities at 80% RH and 30° C. The film containing PVA and PMAA at a weight ratio of 90:10 had an oxygen permeability of 18 ml(STP)/m².day.atm{Pa}, while the film containing PVA and PMAA at a weight ratio of 80:20 had an oxygen permeability of 31 ml(STP)/m².day.atm{Pa}. These heat-treated films were both insoluble in boiling water (Example 4).

As described above, it is understood that the films obtained by the mixtures containing PVA and PMAA at a weight ratio of 90:10 to 80:20 are excellent in oxygen gas barrier property under high-humidity conditions.

For the sake of comparison, a dry film was formed and then subjected to a heat treatment in the same manner as in Example 4 except that a 10 wt. % aqueous solution of PMAA was used instead of the mixtures of PVA and PMAA in Example 4. The oxygen permeability of the film was 5000 ml(STP)/m².day.atm{Pa}. This heat-treated film was soluble in boiling water (Comparative Example 3).

We claim:

1. A gas barrier film formed from a mixture containing polyvinyl alcohol and poly(meth) acrylic acid at a weight ratio of 95:5 to 20:80, having an oxygen permeability constant of $1.25 \times 10^{-3}$ ml(STP).cm/m².h.atm{Pa} or smaller as measured under conditions of 30° C. and 80% relative humidity, and being insoluble in boiling water.

2. The gas barrier film as claimed in claim 1, wherein the polyvinyl alcohol has a saponification degree of at least 95% and an average polymerization degree ranging from 300 to 2,500.

3. The gas barrier film as claimed in claim 1, wherein the poly(meth)acrylic acid is polyacrylic acid, polymethacrylic acid or a mixture thereof.

4. The gas barrier film as claimed in claim 1, wherein the film is formed from a mixture containing the polyvinyl alcohol and the poly(meth) acrylic acid at a weight ratio of 90:10 to 20:80.

5. The gas barrier film as claimed in claim 1, wherein the film is formed from a mixture containing the polyvinyl alcohol and the poly(meth)acrylic acid at a weight ratio of 80:20 to 20:80.

6. The gas barrier film as claimed in claim 1, wherein the film is formed from a mixture containing the polyvinyl alcohol and the poly(meth)acrylic acid at a weight ratio of 60:40 to 20:80.

7. The gas barrier film as claimed in claim 1, wherein the oxygen permeability constant is $6.25 \times 10^{-4}$ ml(STP).cm/m².h.atm{Pa} or smaller.

8. The gas barrier film as claimed in claim 1, wherein the oxygen permeability constant is $3.13 \times 10^{-4}$ ml(STP).cm/m².h.atm{Pa} or smaller.

9. A process for the production of a gas barrier film, which comprises forming a film from a mixture containing polyvinyl alcohol and poly(meth)acrylic acid at a weight ratio of 95:5 to 20:80, and then subjecting the film to a heat treatment under conditions satisfying the following relationships (a) and (b):

$$\log t \geq -0.0282 \times T + 14.14 \quad \text{(a)}$$

$$373 \leq T \leq 523 \quad \text{(b)}$$

wherein t means heat-treating time (min) and T denotes a heat-treating temperature (K.).

10. The process as claimed in claim 9, wherein the polyvinyl alcohol has a saponification degree of at least 95% and an average polymerization degree ranging from 300 to 2,500.

11. The process as claimed in claim 9, wherein the poly(meth)acrylic acid is polyacrylic acid, polymethacrylic acid or a mixture thereof.

12. The process as claimed in claim 9, wherein the film is formed from a mixture containing the polyvinyl alcohol and the poly(meth)acrylic acid at a weight ratio of 90:10 to 20:80.

13. The process as claimed in claim 9, wherein the film is formed from a mixture containing the polyvinyl alcohol and the poly(meth)acrylic acid at a weight ratio of 80:20 to 20:80.

14. The process as claimed in claim 9, wherein the film is formed from a mixture containing the polyvinyl alcohol and the poly(meth)acrylic acid at a weight ratio of 60:40 to 20:80.

15. The process as claimed in claim 9, wherein the film is formed by a solvent casting process from an aqueous solution of the mixture containing the polyvinyl alcohol and the poly(meth)acrylic acid.

16. The process as claimed in claim 9, wherein the film formed from the mixture containing the polyvinyl alcohol and the poly(meth)acrylic acid is subjected to a heat treatment under conditions satisfying the following relationships (c) and (b):

$$\log t \geq -0.0278 \times T + 14.14 \quad \text{(c)}$$

$$373 \leq T \leq 523. \quad \text{(b)}$$

17. The process as claimed in claim 9, wherein the film formed from the mixture containing the polyvinyl alcohol and the poly(meth) acrylic acid is subjected to a heat treatment under conditions satisfying the following relationships (d) and (b):

$$\log t \geq -0.0274 \times T + 14.14 \quad \text{(d)}$$

$$373 \leq T \leq 523. \quad \text{(b)}$$

* * * * *